United States Patent
Lewis et al.

(10) Patent No.: US 9,984,159 B1
(45) Date of Patent: May 29, 2018

(54) PROVIDING INFORMATION ABOUT CONTENT DISTRIBUTION

(71) Applicant: Google LLC, Mountain View, CA (US)

(72) Inventors: Justin Lewis, Marina del Rey, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 635 days.

(21) Appl. No.: 14/457,779

(22) Filed: Aug. 12, 2014

(51) Int. Cl.
*G06F 7/00* (2006.01)
*G06F 17/30* (2006.01)

(52) U.S. Cl.
CPC .. *G06F 17/30864* (2013.01); *G06F 17/30598* (2013.01)

(58) Field of Classification Search
CPC .............. G06Q 30/02; G06Q 10/0639; G06Q 30/0201; G06Q 30/0243; G06Q 30/0256; G06Q 30/0267; G06Q 30/08; G06F 17/30705; G06F 17/30722; G06F 17/30731; G06F 17/30864; G06F 17/30867
See application file for complete search history.

(56) References Cited

U.S. PATENT DOCUMENTS

| | | | |
|---|---|---|---|
| 7,224,689 B2 | 5/2007 | Freeman | |
| 7,548,929 B2 | 6/2009 | Collins et al. | |
| 7,668,950 B2 | 2/2010 | Horowitz et al. | |
| 7,707,127 B2 | 4/2010 | Jhala et al. | |
| 7,801,899 B1 | 9/2010 | Spitkovsky | |
| 7,849,080 B2 | 12/2010 | Chang et al. | |
| 7,921,107 B2 | 4/2011 | Chang et al. | |
| 8,074,234 B2 | 12/2011 | Tang et al. | |
| 8,204,838 B2 | 6/2012 | Schwaighofer et al. | |
| 8,214,348 B2 | 7/2012 | Liu et al. | |
| 8,275,722 B2 | 9/2012 | Jhala et al. | |
| 8,291,024 B1 * | 10/2012 | Cheng | H04L 51/12 709/206 |

(Continued)

OTHER PUBLICATIONS

Chen et al., "Advertising Keyword Suggestion Based on Concept Hierarchy," WSDM'08, Feb. 11-12, 2008, 251-260.

(Continued)

*Primary Examiner* — Taelor Kim
(74) *Attorney, Agent, or Firm* — Fish & Richardson P.C.

(57) ABSTRACT

Methods, systems, and apparatus, including computer programs encoded on non-transitory computer storage media. One of the methods is performed by a computer system and includes receiving data representing first keywords selected by a user to constitute a first group of keywords and data representing distinct second keywords selected by the user to constitute a second group of keywords; determining first characteristics of each of the first keywords and second characteristics of each of the second keywords; identifying a common characteristic, common to both the first characteristics and the second characteristics; identifying third keywords that have the common characteristic, wherein all of the third keywords are neither first keywords nor second keywords; obtaining one or more metrics associated with the first, second, and third keywords; and outputting data to enable rendering, on a computing device, a graphic presentation about the first keywords, the second keywords, the third keywords, and the metrics.

19 Claims, 7 Drawing Sheets

(56) References Cited

U.S. PATENT DOCUMENTS

| | | |
|---|---|---|
| 8,392,249 B2 | 3/2013 | Koningstein et al. |
| 8,645,192 B1 | 2/2014 | Sandberg et al. |
| 2007/0027761 A1 | 2/2007 | Collins et al. |
| 2007/0027762 A1 | 2/2007 | Collins et al. |
| 2007/0027864 A1 | 2/2007 | Collins et al. |
| 2007/0027865 A1 | 2/2007 | Bartz et al. |
| 2007/0033103 A1 | 2/2007 | Collins et al. |
| 2007/0033104 A1 | 2/2007 | Collins et al. |
| 2007/0061211 A1 | 3/2007 | Ramer et al. |
| 2007/0143176 A1 | 6/2007 | Nong et al. |
| 2007/0192164 A1 | 8/2007 | Nong et al. |
| 2008/0005107 A1* | 1/2008 | Funaki ............. G06F 17/30722 |
| 2008/0243480 A1 | 10/2008 | Bartz et al. |
| 2008/0243826 A1 | 10/2008 | Bartz et al. |
| 2008/0249855 A1 | 10/2008 | Collins et al. |
| 2008/0255937 A1 | 10/2008 | Chang et al. |
| 2008/0256039 A1 | 10/2008 | Chang et al. |
| 2008/0256056 A1 | 10/2008 | Chang et al. |
| 2008/0256059 A1 | 10/2008 | Chang et al. |
| 2008/0256060 A1 | 10/2008 | Chang et al. |
| 2008/0256061 A1 | 10/2008 | Chang et al. |
| 2008/0256561 A1 | 10/2008 | Tang et al. |
| 2008/0270223 A1 | 10/2008 | Collins et al. |
| 2008/0270333 A1 | 10/2008 | Jhala et al. |
| 2008/0288328 A1* | 11/2008 | Minor ................ G06Q 10/0639 705/14.42 |
| 2009/0037399 A1 | 2/2009 | Bartz et al. |
| 2009/0089169 A1 | 4/2009 | Gupta et al. |
| 2009/0198684 A1 | 8/2009 | Collins et al. |
| 2009/0222329 A1 | 9/2009 | Ramer et al. |
| 2009/0234711 A1 | 9/2009 | Ramer et al. |
| 2009/0234861 A1 | 9/2009 | Ramer et al. |
| 2009/0240568 A1 | 9/2009 | Ramer et al. |
| 2009/0240569 A1 | 9/2009 | Ramer et al. |
| 2009/0240586 A1 | 9/2009 | Ramer et al. |
| 2009/0265230 A1 | 10/2009 | Plachouras et al. |
| 2009/0265290 A1 | 10/2009 | Ciaramita et al. |
| 2009/0292677 A1 | 11/2009 | Kim |
| 2009/0299855 A1* | 12/2009 | Li ......................... G06Q 30/02 705/14.54 |
| 2009/0299998 A1 | 12/2009 | Kim |
| 2010/0063877 A1 | 3/2010 | Soroca et al. |
| 2010/0076994 A1 | 3/2010 | Soroca et al. |
| 2010/0094878 A1 | 4/2010 | Soroca et al. |
| 2010/0138428 A1* | 6/2010 | Uchino ............. G06F 17/30864 707/751 |
| 2010/0169249 A1 | 7/2010 | Jhala et al. |
| 2010/0223125 A1 | 9/2010 | Spitkovsky |
| 2010/0262568 A1 | 10/2010 | Schwaighofer et al. |
| 2010/0268712 A1* | 10/2010 | Ngwije ............. G06F 17/30705 707/737 |
| 2011/0035276 A1 | 2/2011 | Ghosh et al. |
| 2011/0093331 A1 | 4/2011 | Metzler et al. |
| 2011/0208708 A1 | 8/2011 | Liu et al. |
| 2011/0258049 A1 | 10/2011 | Ramer et al. |
| 2011/0258054 A1 | 10/2011 | Pandey et al. |
| 2011/0295678 A1 | 12/2011 | Seldin et al. |
| 2012/0173358 A1 | 7/2012 | Soroca et al. |
| 2012/0173359 A1 | 7/2012 | Soroca et al. |
| 2012/0173360 A1 | 7/2012 | Soroca et al. |
| 2012/0173361 A1 | 7/2012 | Soroca et al. |
| 2012/0173362 A1 | 7/2012 | Soroca et al. |
| 2012/0173363 A1 | 7/2012 | Soroca et al. |
| 2012/0173364 A1 | 7/2012 | Soroca et al. |
| 2012/0173365 A1 | 7/2012 | Soroca et al. |
| 2012/0173366 A1 | 7/2012 | Soroca et al. |
| 2012/0173367 A1 | 7/2012 | Soroca et al. |
| 2012/0173368 A1 | 7/2012 | Soroca et al. |
| 2012/0173369 A1 | 7/2012 | Soroca et al. |
| 2012/0173370 A1 | 7/2012 | Soroca et al. |
| 2012/0173371 A1 | 7/2012 | Soroca et al. |
| 2012/0173372 A1 | 7/2012 | Soroca et al. |
| 2012/0173373 A1 | 7/2012 | Soroca et al. |
| 2012/0173374 A1 | 7/2012 | Soroca et al. |
| 2012/0173375 A1 | 7/2012 | Soroca et al. |
| 2012/0173378 A1 | 7/2012 | Soroca et al. |
| 2012/0173379 A1 | 7/2012 | Soroca et al. |
| 2012/0179562 A1 | 7/2012 | Soroca et al. |
| 2012/0179563 A1 | 7/2012 | Soroca et al. |
| 2012/0179564 A1 | 7/2012 | Soroca et al. |
| 2012/0179565 A1 | 7/2012 | Soroca et al. |
| 2012/0179566 A1 | 7/2012 | Soroca et al. |
| 2012/0179567 A1 | 7/2012 | Soroca et al. |
| 2012/0179568 A1 | 7/2012 | Soroca et al. |
| 2012/0185349 A1 | 7/2012 | Soroca et al. |
| 2012/0209705 A1 | 8/2012 | Ramer et al. |
| 2012/0209706 A1 | 8/2012 | Ramer et al. |
| 2012/0209707 A1 | 8/2012 | Ramer et al. |
| 2012/0209708 A1 | 8/2012 | Ramer et al. |
| 2012/0209709 A1 | 8/2012 | Ramer et al. |
| 2012/0209710 A1 | 8/2012 | Ramer et al. |
| 2012/0215602 A1 | 8/2012 | Ramer et al. |
| 2012/0215612 A1 | 8/2012 | Ramer et al. |
| 2012/0215622 A1 | 8/2012 | Ramer et al. |
| 2012/0215623 A1 | 8/2012 | Ramer et al. |
| 2012/0215624 A1 | 8/2012 | Ramer et al. |
| 2012/0215625 A1 | 8/2012 | Ramer et al. |
| 2012/0215626 A1 | 8/2012 | Ramer et al. |
| 2012/0215635 A1 | 8/2012 | Ramer et al. |
| 2012/0215639 A1 | 8/2012 | Ramer et al. |
| 2012/0215640 A1 | 8/2012 | Ramer et al. |
| 2013/0055097 A1 | 2/2013 | Soroca et al. |
| 2013/0091142 A1 | 4/2013 | Joseph et al. |
| 2013/0185149 A1 | 7/2013 | Koningstein et al. |
| 2013/0254035 A1 | 9/2013 | Ramer et al. |
| 2013/0262247 A1 | 10/2013 | Dekel et al. |
| 2013/0304581 A1 | 11/2013 | Soroca et al. |
| 2014/0108369 A1* | 4/2014 | Nijjer ..................... H04L 63/08 707/706 |
| 2014/0114744 A1 | 4/2014 | Koningstein |
| 2014/0122464 A1* | 5/2014 | Arunachalam ... G06F 17/30867 707/723 |

OTHER PUBLICATIONS

'Edward Tufte' [online]. "The Work of Edward Tufte and Graphics Press," retrieved on Aug. 13, 2014. Retrieved from the Internet: URL<http://www.edwardtufte.com/tufte/>, 3 pages.

Popova, "7 Essential Books on Data Visualization & Computational Art," Brain Pickings, Jun. 30, 2011 [retrieved on Aug. 13, 2014]. Retrieved from the Internet: URL<http://www.brainpickings.org/index.php/2011/06/30/best-books-data-visualization-computational-art/>, 12 pages.

Cotgreave, "8 great books about data visualization," Tableau Software, Jul. 22, 2013 [retrieved on Aug. 13, 2014]. Retrieved from the Internet: URL<http://www.tableausoftware.com/about/blog/2013/7/list-books-about-data-visualization-24182>, 3 pages.

'Wikipedia' [online]. "Categorization," Jul. 11, 2014 [retrieved on Aug. 13, 2014]. Retrieved from the Internet: URL<http://en.wikipedia.org/wiki/Categorization>, 4 pages.

* cited by examiner

PROVIDING INFORMATION ABOUT CONTENT DISTRIBUTION

TECHNICAL FIELD

This disclosure relates generally to providing information about content distribution, which may be specific to a content provider.

BACKGROUND

The Internet provides access to a wide variety of resources. For example, content providers serve video, audio, and Web pages over the Internet. These resources present opportunities for other content (e.g., advertisements, or "ads") to be provided along with the resources. For example, a Web page can include slots in which ads can be presented. The slots can be allocated to other content providers (e.g., advertisers) for the presentation of content.

SUMMARY

An example system for providing information about content distribution may perform the following operations: tagging first keywords that are selected for distribution of content; tagging second keywords for which a selection for distribution of content is pending; identifying third keywords that have a relationship to the first keywords and to the second keywords; tagging the third keywords; binning, based on tags associated therewith, the first keywords into a first bucket, the second keywords into a second bucket, and the third keywords into a third bucket; generating one or more data objects based on the first bucket, the second bucket, and the third bucket; obtaining, based on the one or more data objects, one or more metrics associated with the first keywords, the second keywords, and the third keywords; and outputting data to enable rendering, on a computing device, of a graphic presentation based on the data objects. The example system may include one or more of the following features, either alone or in combination.

The one or more metrics may include an expected economic value associated with at least the third keywords. The expected economic value may be determined based on past economic value resulting from use of the third keywords in past content distribution. At least some of the data may represent the expected economic value. The one or more metrics may include a first metric and a second metric. The second metric may include attributes associated with the first keywords, the second keywords and the third keywords. The attributes may be determined based on past use of the first keywords, the second keywords and the third keywords in past content distributions. The graphic representation may include a graphic that is shaped by the first metric and that incorporates information about the second metric, or the graphic representation include a graphic that is shaped by the second metric and incorporates information about the first metric.

Identifying the third keywords may include: determining a characteristic common to both the first keywords and the second keywords; and searching one or more databases of keywords for other keywords that have the characteristic. The other keywords having the characteristic may be the third keywords. The characteristic may include a category among multiple categories of keywords. The category may reflect a subject matter of keywords or a relationship of keywords to proprietary content.

The example system may perform operations including: outputting, to the computing device, data representing a list of the data objects, where the list includes indicia identifying the data objects; and receiving, from the computing device, data representing a selection corresponding to one of the data objects from the list. The data to enable the rendering may be output in response to receipt of the data representing the selection. The example system may perform operations including: storing the one or more data objects on one or more servers; and retrieving, from the one or more servers, the data to enable the rendering from the one or more servers in response to receipt of the data representing the selection. The example system may perform operations including: in response to receipt of the data representing the selection, performing one or more calculations based on the data objects to generate at least some of the data to enable the rendering.

The content may include online advertising and the one or more keywords may be associated with the online advertising for distribution of the online advertising for rendering on a computing device.

An example system for providing information about content distribution may perform the following operations: identifying metrics associated with viewing of first online content, where each instance of first online content is also associated with a category to which the instance of online content belongs; associating each instance of first online content with data representing one or more of the metrics; identifying second online content having a relationship to, or commonality with, the first online content; determining metrics associated with the second online content; and outputting data to enable rendering, on a computing device, of a user-configurable graphic presentation based on the first online content, metrics associated with the first online content, metrics associated with the second online content, and categories associated with the first and second online content.

Two or more of the features described in this disclosure/specification, including this summary section, can be combined to form implementations not specifically described herein.

The systems and techniques described herein, or portions thereof, can be implemented as a computer program product that includes instructions that are stored on one or more non-transitory machine-readable storage media, and that are executable on one or more processing devices. The systems and techniques described herein, or portions thereof, can be implemented as an apparatus, method, or electronic system that can include one or more processing devices and memory to store executable instructions to implement the stated operations.

The details of one or more implementations are set forth in the accompanying drawings and the description below. Other features, objects, and advantages will be apparent from the description and drawings, and from the claims.

DESCRIPTION OF THE DRAWINGS

Like reference symbols in the various drawings indicate like elements.

DETAILED DESCRIPTION

Figure 1:
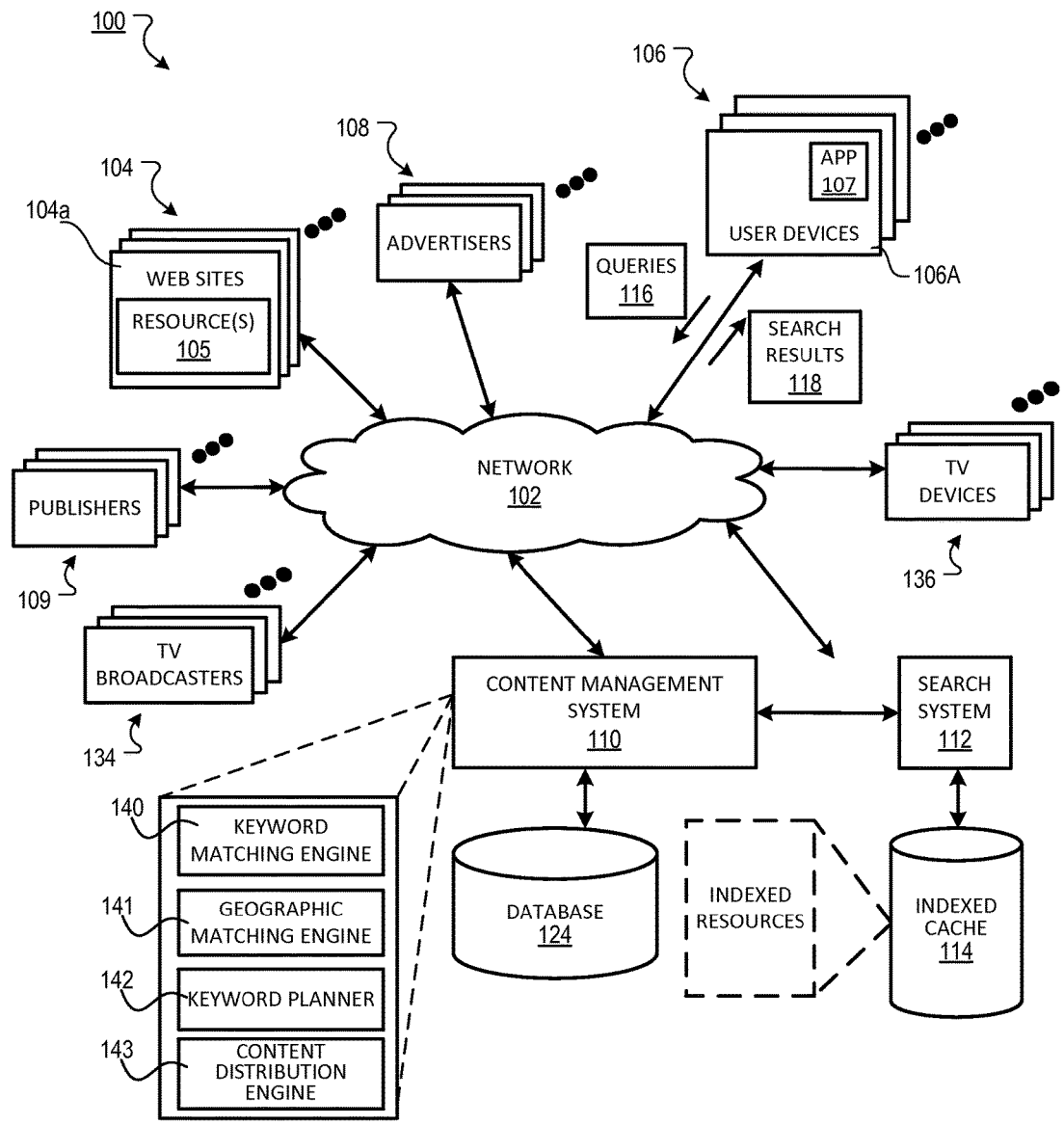
FIG. 1 is a block diagram of an example network environment on which the example processes described herein can be implemented.

The example systems and processes herein are initially described in the context of online advertising (referred to as an "ad" or "ads"); however, the systems and processes described herein are applicable for use with any appropriate type of online content in any appropriate type of distribution process.

Content, such as advertising, may be provided to network users based, e.g., on demographics, keywords, language, and interests. For example, an ad may be associated with one or more keywords that are stored as metadata along with the ad. A search engine, which operates on the network, may receive input from a user. The input may include one or more of the keywords. A content management system, which serves ads, may receive the keywords from the search engine, identify an ad as being associated with one or more of the keywords, and output the ad to the user, along with content that satisfies the initial search request. The content and the ad are displayed on a computing device. When displayed, the ad is incorporated into an appropriate slot on a search results page in this example. The user may select the ad by clicking-on the ad. In response, a hyperlink associated with the ad directs the user to another Web page. For example, if the ad is for ABC Travel Company, the Web page to which the user is directed may be the home page for ABC Travel Company. This type of content access is known as click-through. In this context, a "click" is not limited to a mouse click, but rather may include a touch, a programmatic selection, or any other interaction by which the ad may be selected.

A content auction may be run to determine which content is to be output in response to a query containing keywords or other parameters. In the auction, content providers may bid on specific keywords (which are associated with content). For example, a sporting goods ads provider may associate words such as "baseball", "football" and "basketball"" with their ads. The content provider may bid on those keywords in the content auction, typically on a cost-per-click (CPC) basis.

The content provider's bid is an amount (e.g., a maximum amount) that the content provider will pay in response to users clicking on their displayed content. So, for example, if a content provider bids five cents per click, then the content provider may pay five cents each time their content is clicked-on by a user, depending upon the type of the auction. In other examples, payment need not be on a cost-per-click (CPC) basis, but rather may be on the basis of other actions (e.g., an amount of time spent on a landing page, a purchase, and so forth).

Bidding in a content auction typically takes place against other content providers bidding for, e.g., the same keywords. So, for example, if a user enters a query into a search engine (to perform a search for related content), a content management system may select content items from different content providers that are associated with keywords in the query or variants thereof. The content auction is then run (e.g., by the content management system) to determine which content (e.g., which ads) to serve along with the search results or any other requested content. The winner may be decided, e.g., based on bidding price, relevance of the keywords to content, and other factors. In this context, a page includes any display area, such as a Web page, a continuously scrollable screen, and so forth. In some implementations, winners of the content auction will be accorded the most preferred slot(s) on the page, while others will be accorded slots that are less preferred.

Content providers may "purchase" keywords by providing a bid for those keywords. In the case of an online advertiser, the advertiser may have an account with the content management system for each campaign that the advertiser runs. The advertiser may select certain keywords on which to bid, and agree to pay an amount of money for the selected keywords. For example, the advertiser may agree to pay a certain fee for a number of impressions that result from an ad distributed due to use of a particular keyword. In some examples, the advertiser may agree to pay a fee for a number of clicks on an ad that is distributed due to use of a particular keyword, or the advertiser may agree to pay a fee for a number of purchases that are attributable to an ad that is distributed due to use of a particular keyword. Various other payment strategies may be used in the context of a content auction.

In some example systems, a keyword may be either purchased, pending, or neither purchased nor pending. In the case of a purchased keyword, a content provider has already provided a bid for a keyword. In the case of a pending keyword, the content provider has expressed an interest, e.g., by selecting the keyword, but has not placed an active bid. Some keywords are neither purchased nor pending, which means that the content provider has not bid on those keywords and has not expressed an interest in those keywords. These keywords may be referred to as "new" keywords, at least for the content provider. Some example systems store, in association with the content provider and the content provider's account, information identifying purchased and pending keywords. Available keywords that are neither purchased nor pending are thus identifiable by a lack of association to the content provider or the content provider's account.

Content provider purchasing decisions may be affected by various factors. For example, a content provider may purchase keywords based on their anticipated economic value. In this regard, in some examples, the economic value of a keyword to a content provider includes the amount of money that the keyword generates for a content provider less the cost of payment for the keyword. So, for example, if an advertiser stands to make $X on conversions that are attributable to a keyword, and use of the keyword cost the advertiser $Y, then the economic value of the keyword may be defined as, or be based on, $X-Y (other factors may also be accounted for in a keyword's economic value).

Metrics, such as economic value, may not be readily available to a content provider when deciding whether to purchase a keyword. Accordingly, described herein is a keyword planner that provides a content provider with the ability to view metrics associated with the keywords, and the ability to customize the view so that desired metrics are displayed. For example, the keyword planner may generate one or more charts showing the number of keywords in a particular category that are purchased, the number of keywords in that category that are pending, and the number of keywords in the category that are neither purchased nor pending. The keyword planner, however, is not limited to use with categories of keywords or to keywords, as described below. The chart may be decorated with additional information, such as the aggregate economic value of each part of the chart, the number of impressions associated with each part, the number of clicks associated with each part, the number of conversions associated with each part, and any other appropriate metric associated with each part. The decorations may be implemented textually, graphically, or by any other appropriate mechanism.

The graphical representation may be configurable by the user (e.g., the content provider) so that a particular metric defines the graphic, and so that the graphic includes selected decorations. In an example implementation, the graphic may be a pie chart, and the user may configure the pie chart to represent any appropriate metric. For example, the user may configure the graphic so that it graphically distinguishes, by economic value, keywords in a particular category that are purchased, keywords in that category that are pending, and keywords in the category that are neither purchased nor pending. The chart may also include one or more appropriate additional decorations that reflect other metrics.

As explained above, in some implementations, the graphics are based on categories of keywords. In this regard, examples on which a category may be based include, but not limited to, a subject matter associated with a keyword (e.g., electronics-related keywords), proprietary content associated with a keyword (e.g., keywords related to a particular move or to a particular brand), and geography (e.g., keywords relevant to particular location(s)).

In some implementations, the system may include a database of keywords that are indexed by category, and there may be metadata associated with each keyword. In these example systems, to identify keywords associated with a particular category, the system may perform a search of the index or a search based on the metadata, and return appropriate results.

In some implementations, the system may present graphic(s) that are specific to a content provider. Accordingly, in some examples, the system may perform a search of all accounts owned by a content provider, and generate an appropriate graphic for the content provider as a whole. In some implementations, the system may present graphic(s) that are specific to a single content provider's account. For example, the system may limit purchased and pending keywords to those that are purchased or pending for an account.

In some implementations, as described below, graphics such as those described herein are applicable to other services including, but not limited to, online video viewing/distribution, electronic commerce, and so forth. However, the following description focuses on an online advertising example.

FIG. 1 is a block diagram of an example environment 100 on which the processes described herein may be implemented. Any of the entities of FIG. 1 may be implemented, for example, using one or more servers or processing devices, such as those described with respect to FIG. 7. The designations given to these entities are for illustrative purposes and are non-limiting.

Network 102 can represent a communications network that can allow devices, such as a user device 106a, to communicate with entities on the network through a communication interface (not shown), which can include digital signal processing circuitry. Network 102 can include one or more networks. The network(s) can provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication can occur through a radio-frequency transceiver. In addition, short-range communication can occur, such as using a Bluetooth®, WiFi®, or other such transceiver.

Network 102 connects various entities, such as Web sites 104, user devices 106, content providers (e.g., advertisers 108), online publishers 109, and a content management system 110. In this regard, example environment 100 can include many thousands of Web sites 104, user devices 106, and content providers (e.g., advertisers 108). Entities connected to network 102 include and/or connect through one or more servers. Each such server can be one or more of various forms of servers, such as a Web server, an application server, a proxy server, a network server, or a server farm. Each server can include one or more processing devices, memory, and a storage system.

Web sites 104 can include one or more resources 105 hosted by one or more servers. An example Web site 104a is a collection of Web pages formatted in hypertext markup language (HTML) that can contain text, images, multimedia content, and programming elements, such as scripts. Each Web site 104 can be maintained by a publisher 109, which may be an entity that controls, manages and/or owns the Web site 104 (on which advertising may be presented).

A resource 105 can be any appropriate data that can be provided over network 102. A resource 105 can be identified by a resource address that is associated with the resource 105. Resources 105 can include HTML pages, word processing documents, portable document format (PDF) documents, images, video, and news feed sources, to name a few. Resources 105 can include, but are not limited to, content, such as words, phrases, images and sounds, that can include embedded information (such as meta-information hyperlinks) and/or embedded instructions (such as JavaScript® scripts). Examples of resources also include information about keywords, online video, electronic commerce, or any other subject for which a graphic is generated.

To facilitate searching of resources 105, environment 100 can include a search system 112 (including a search engine) that identifies resources 105 by crawling and indexing the resources 105. Data about resources 105 can be indexed based on the resource to which the data corresponds. The indexed and, optionally, cached copies of resources 105 can be stored in an indexed cache 114.

An example user device 106a is an electronic device that is under control of a user and that is capable of requesting and receiving resources over the network 102. A user device can include one or more processing devices, and can be, or include, a mobile telephone (e.g., a smartphone), a laptop computer, a handheld computer, an interactive or so-called "smart" television or set-top box, a tablet computer, a network appliance, a camera, an enhanced general packet radio service (EGPRS) mobile phone, a media player, a navigation device, an email device, a game console, or a combination of any two or more of these data processing devices or other data processing devices. In some implementations, the user device can be included as part of a motor vehicle.

User device 106a may include/store one or more user applications, such as a Web browser, to facilitate the sending and receiving of data over network 102. A user device 106a that is mobile (or simply, "mobile device"), such as a smartphone or a table computer, can include an application ("app") 107 that allows the user to conduct a network (e.g., Web) search.

User device 106a can request resources 105 from a Web site 104a (e.g., from a Web site hosting the keyword planner described herein). In turn, data representing resource 105 can be provided to the user device 106a for presentation by the user device 106a. User devices 106 can also submit search queries 116 to the search system 112 over the network 102. A request for a resource 105 or a search query 116 sent from a user device 106 can include an identifier, such as a cookie, identifying the user of the user device.

In response to a search query 116, the search system 112 can access the indexed cache 114 to identify resources 105 that are relevant to the search query 116 (e.g., information about keywords). The search system 112 identifies the resources 105 in the form of search results 118 and returns the search results 118 to a user device 106 in search results pages. A search result 118 can include data generated by the search system 112 that identifies a resource 105 that is responsive to a particular search query 116.

Content management system 110 can be used for selecting and providing content (e.g., ads, video, and so forth) in response to requests for content. Content management system 110 also can, with appropriate user permission, update database 124 based on activity of a user. The user may enable and/or disable the storing of such information. With appropriate user permission obtained beforehand, database 124 can store a profile for the user. In some implementations, the information in database 124 can be derived, for example, from one or more of a query log, an advertisement log, or requests for content.

Database 124 can also store information about keywords including, but not limited to, their current status (e.g., purchased, pending, or neither), information about their economic value to a particular user, indexing information and metadata as described above, click-through rates resulting from past use, conversion rates resulting from past use, purchase rates resulting from past use, along with any other appropriate information relating to the keyword. In some cases, prior permission may be required before storing and maintaining database 124.

Content management system 110 may include a keyword matching engine 140 to compare query keywords to content keywords and to generate a keyword matching score indicative of how well the query keywords match the content keywords. In an example, the keyword matching score is equal, or proportional, to a sum of a number of matches of words in the input query to words associated with the content. Content management system 110 may include a geographic (or "geo-") matching engine 141 to compare geographic information (e.g., numerical values for place names) obtained from words in input queries to geographic information associated with content. Content management system 110 may also include other engines (not shown) for matching input demographics to desired demographics of an advertising campaign, for identifying Web pages or other distribution mechanisms based on content, and so forth.

When a resource 105 or search results 118 are requested by a user device 106, content management system 110 can receive a request for content to be provided with resource 105 or search results 118. The request for content can include characteristics of one or more "slots" that are defined for the requested resource 105 or search results page. For example, data representing resource 105 can include data specifying a portion of resource 105 or a portion of a user display, e.g., a presentation location of a pop-up window or a slot of a third-party content site or Web page, in which content can be presented. An example slot is an ad slot. Search results pages can also include one or more slots in which other content items (e.g., ads) can be presented.

Information about slots can be provided to content management system 110. For example, a reference (e.g., URL) to the resource for which the slot is defined, a size of the slot, and/or media types that are available for presentation in the slot can be provided to the content management system 110. Similarly, keywords associated with a requested resource or a search query 116 for which search results are requested can also be provided to the content management system 110 to facilitate identification of content that is relevant to the resource or search query 116.

Based at least in part on data generated from and/or included in the request, content management system 110 can select content that is eligible to be provided in response to the request ("eligible content items"). For example, eligible content items can include eligible ads having characteristics matching keywords, understood intents to perform an online activity, geographic information, demographic information, known interests, etc. associated with corresponding content. In some implementations, the universe of eligible content items (e.g., ads) can be narrowed by taking into account other factors, such as previous search queries 116. For example, content items corresponding to historical search activities of the user (obtained with appropriate prior permission of the user) including, e.g., search keywords used, particular content interacted with, sites visited by the user, etc. can also be used in the selection of eligible content items by the content management system 110.

Content management system 110 can select the eligible content items that are to be provided for presentation in slots of a resource 105 or search results page 118 based, at least in part, on results of an auction, such as a second price auction. For example, for eligible content items, content management system 110 can receive bids from content providers (e.g., advertisers 108) and allocate slots, based at least in part on the received bids (e.g., based on the highest bidders at the conclusion of the auction). The bids are amounts that the content providers are willing to pay for presentation (or selection) of their content with a resource 105 or search results page 118. For example, a bid for keywords can specify an amount that a content provider is willing to pay for each 2000 impressions (e.g., presentations) of the content item, referred to as a CPM bid. Alternatively, the bid for keywords can specify an amount that the content provider is willing to pay for a selection (e.g., a click-through) of the content item or a conversion following selection of the content item. This is referred to as cost-per-click (CPC). The selected content item can be determined based on the bids alone, or based on the bids of each bidder being multiplied by one or more factors, such as quality scores derived from content performance, landing page scores, and/or other factors.

In some implementations, TV (Television) broadcasters 134 produce and present television content on TV user devices 136, where the television content can be organized into one or more channels. TV broadcasters 134 can include, along with the television content, one or more content slots in which other content (e.g., advertisements) can be presented. For example, a TV network can sell slots of advertising to advertisers in television programs that they broadcast. Some or all of the content slots can be described in terms of user audiences which represent typical users who watch content with which a respective content slot is associated. Content providers can bid, in an auction (as described above), on a content slot that is associated with keywords for particular television content.

Content management system 110 may include keyword planner 142. Keyword planner 142 may include executable code to implement the example processes described herein including, but not limited to, processes 200 and 600 below. Content selected for output may be distributed by content distribution engine 143, which is also part of the content management system.

Figure 2:
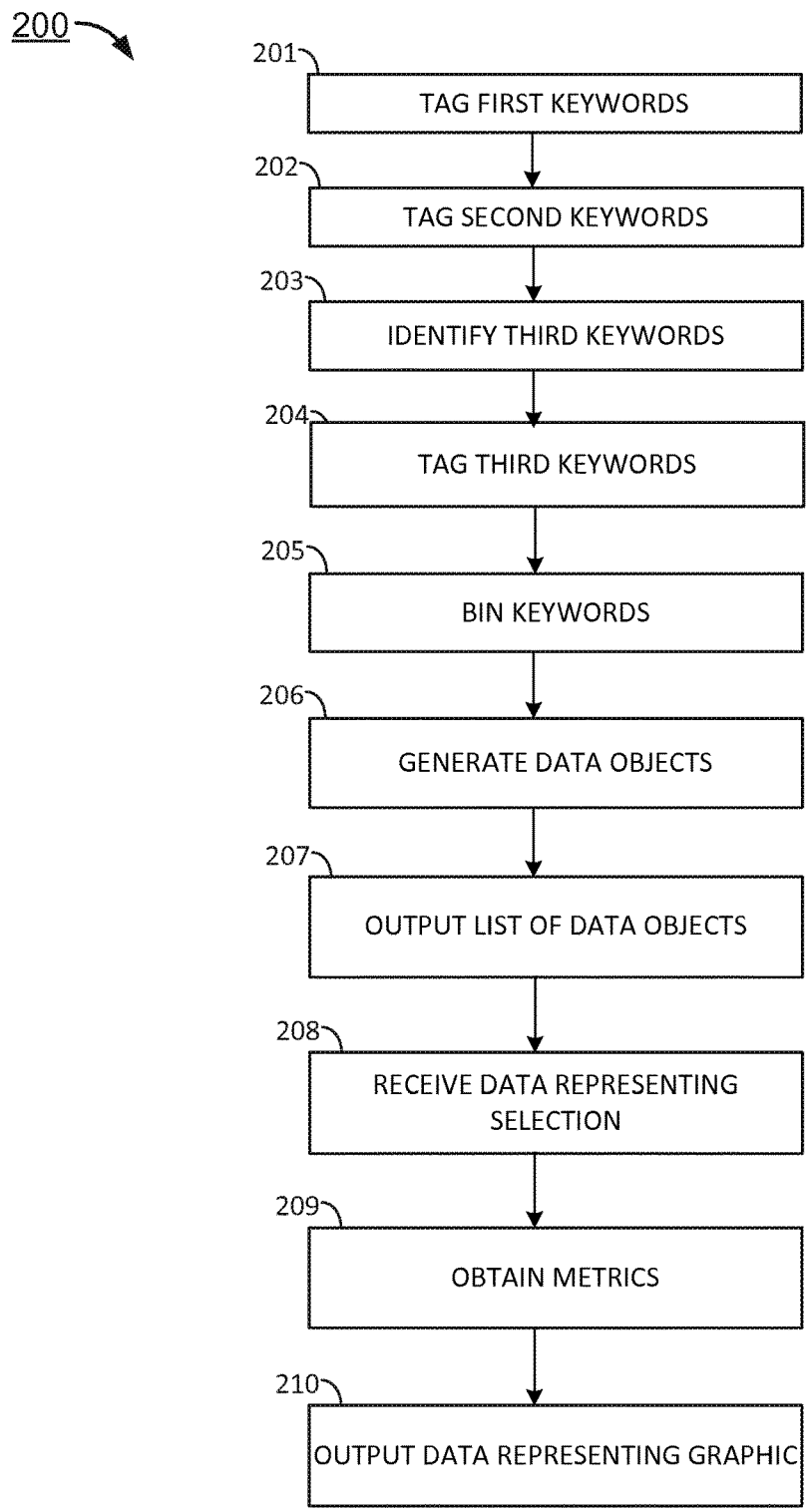
FIG. 2 is flowchart showing an example of a process for providing information about content distribution.

FIG. 2 is a flowchart showing an example of a process 200 for generating one or more graphics to identify information about keywords for purchase. In some implementations, process 200 may be performed by keyword planner 142 in conjunction with the content management system and the search system, which are described above. In some implementations, process 200 may be triggered in response to a specific user request (e.g., clicking on a link), whereas in other implementations process 200 may be triggered automatically in response to an event, such as purchasing or attempting to purchase a keyword.

According to process 200, a first set of keywords that are selected for distribution of content are tagged (201). For example, process 200 may identify keywords that a user (e.g., a content provider) has purchased, and tag those keywords with data indicating that those keywords have been purchased. In some implementations, process 200 instructs the search engine to search a database (e.g., database 124) for information about all user accounts and purchased keywords associated therewith. For example, a content provider may maintain multiple accounts, e.g., one for each advertising campaign. Process 200 may search all of those accounts, or a specified subset thereof, to identify the first set of keywords.

According to process 200, a second set of keywords that are selected for distribution of content are tagged (202). For example, process 200 may identify keywords in which the user has expressed interest, and tag those keywords with data indicating that those keywords are pending. As explained above, in some systems, a user may select a keyword without purchasing the keyword. The content management system may record this selection, along with the identity of the selected keyword and the user (with appropriate permission). As was the case above, in some implementations, process 200 instructs the search engine to search a database (e.g., database 124) for information about all user accounts and pending keywords associated therewith. Process 200 may search all user accounts, or a specified subset thereof, to identify the second keywords.

According to process 200, a third set of keywords are identified (203) that have a relationship to the first and second sets of keywords. For example, process 200 may identify keywords that are available for purchase in the system that are neither currently purchased nor pending. In some implementations, process 200 may identify keywords in a same category as the first set of keywords and/or the second set of keywords. This may be done by searching a database (e.g., database 124) in which the keywords are indexed by category. In some implementations, process 200 may identify a subject matter of the first and second sets of keywords based on metadata associated therewith, and use that information (e.g., by comparing it to metadata associated with other keywords) to identify keywords that have a relationship to the first and second sets of keywords. Some implementations may use a combination of category-based and metadata-based searching. In some implementations, other techniques may be employed to identify keywords having a relationship to the first and second sets of keywords.

According to process 200, keywords in the third set are tagged (204) with data indicating that those keywords are related to the keywords in the first and second sets of keywords, but are neither purchased nor pending. In some implementations, process 200 may store, in memory, data for the tags associated with keywords in the first, second and third sets of keywords.

According to process 200, keywords in the first set ("the first keywords) are binned (205) into a first bucket based on tags associated with the first keywords, keywords in the second set ("the second keywords") are binned (205) into a second bucket based on tags associated with the second keywords, and keywords in the third set ("the third keywords") are binned (204) into a third bucket based on tags associated with the third keywords. The buckets may correspond to, or be, data objects (as explained below) or storage areas associated with the respective keywords. In some implementations, the size of the buckets are compared to identify the percentage of keywords in each bucket relative to a total including the first, second and third keywords. This information may be relevant to, and used to generate, the graphic presentation described below.

According to process 200, one or more data objects are generated (206) based on the first bucket, the second bucket, and the third bucket. In some implementations, the data objects are identified by, and associated with, their corresponding keyword bucket. In some implementations, each data object has a name, a unique identifier (e.g., a numeric identifier), and data including the percentage of keywords associated with each data object. In some implementations, each data object may store the keywords contained therein and/or one or more pointers in memory to those keywords, which may be stored elsewhere internal to, or external to, the content management system.

In some implementations, the data objects include executable instructions (e.g., one or more computer programs) to determine one or more metrics associated with the first keywords, the second keywords, and the third keywords. In some implementations, the data objects include data representing the one or more metrics (e.g., the one or more metrics are calculated in advance) and/or pointers to data representing the one or more metrics. Examples of the one or more metrics include, but are not limited to, an aggregate economic value of each of the first, second, and third keywords; the number of impressions associated with each of the first, second, and third keywords; the number of clicks associated with each of the first, second, and third keywords; the number of conversions associated with each of the first, second, and third keywords; and any other appropriate metric associated with each of the first, second, and third keywords that can be calculated, determined, or otherwise retrieved by process 200.

According to process 200, data representing a list of the data objects is output (207) to a computing device, examples of which are described herein. In some implementations, the list includes indicia identifying the data objects, including the name of each data object, the percentage of keywords associated with each data object, and an identifier associated with each data object. In some implementations, the list includes other features that enable the user to determine the type of graphic to be generated and presented. For example, the list may include various metric(s) upon which the graphic may be based, the list may include various metrics with which the graphic may be decorated, and so forth. In some implementations, the data is usable to generate a hyperlink or other user-selectable on-screen element, the selection of which corresponds to a selection of a corresponding data object and triggers receipt of data from process 200

According to process 200, data is received (208) that represents a selection corresponding to one of the data objects from the list. In response to receipt of the data representing the selection, process 200 obtains (209), based on the data objects, one or more metrics associated with the first keywords, the second keywords, and the third keywords. In some implementations, in response to receipt of the data representing the selection, process 200 obtains the metric(s) by retrieving them directly from a corresponding data object or by retrieving them from a location specified in the corresponding data object. In some implementations, in response to receipt of the data representing the selection, process 200 obtains the metric(s) by executing instructions in the corresponding data object or identified via the corresponding data object (e.g., through pointers or the like) to perform one or more calculations to calculate the metric(s). For example, process 200 may calculate an expected economic value of a set of keywords in a category (e.g., keywords listed as pending) by identifying the number of conversions attained from those keywords in one or more past ad campaigns, determining the expected cost to the advertiser, and taking into account various other factors in its determination.

According to process 200, data is output (210) representing a graphic that reflects the desired input configuration of the user. The data enables rendering of a graphic presentation on the computing device that is based on information obtained through the data objects. As explained above, the graphic may be configured based on user selection input, e.g., through a Web page or other interactive computer program. In some implementations, the graphic may be shaped by one metric and incorporate information about other metric(s), or the graphic may be shaped by the other metric(s) and incorporate information about the one metric. Examples of different graphics produced by process 200 are shown in FIGS. 3 and 4.

Figure 3:
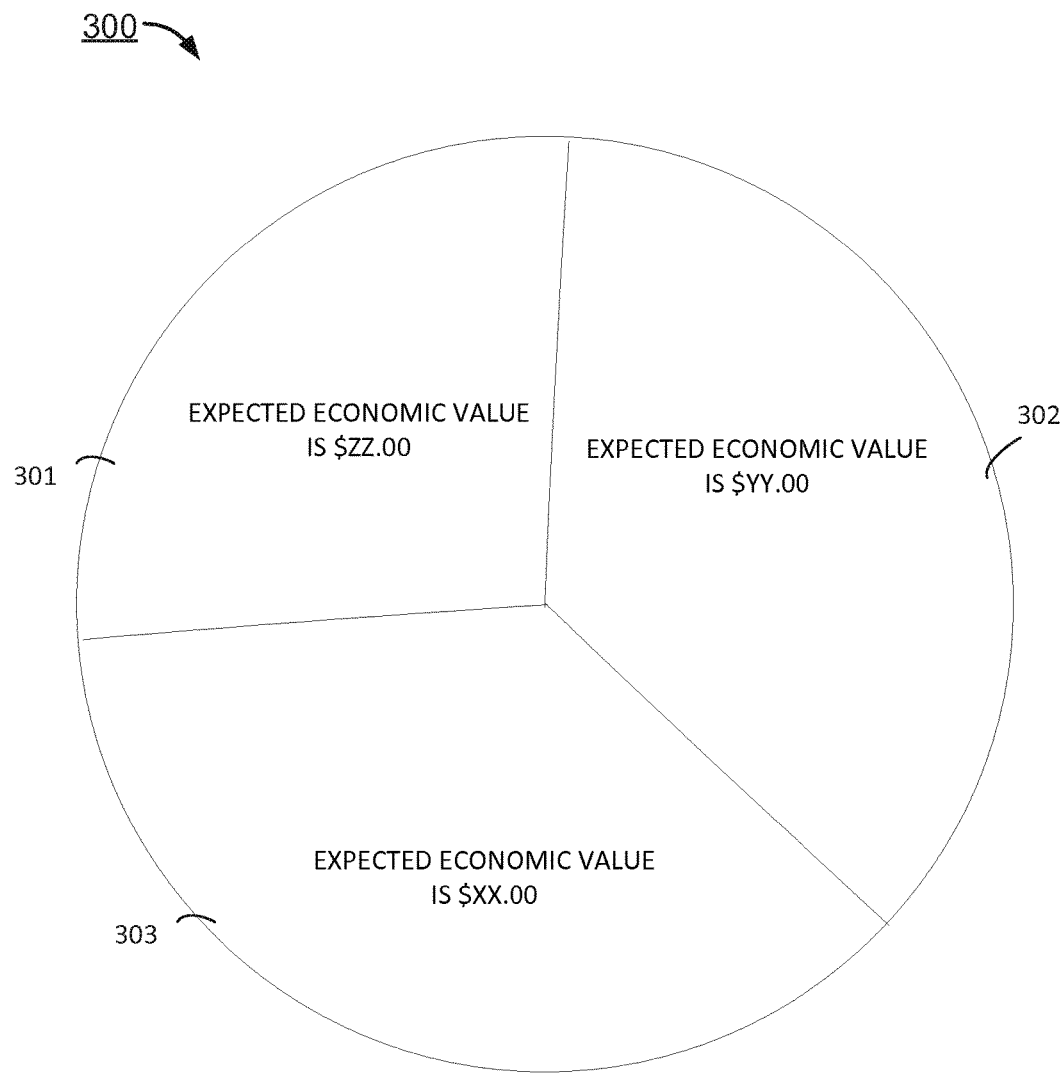
FIGS. 3, 4 and 5 are examples of graphic presentations that may be generated by the example process of FIG. 2.

In this regard, by way of example, a user may select to generate a graphic, such as graphic 300 of FIG. 3. In this example, the graphic includes a pie chart having a slice 301 sized to reflect the number of keywords in a particular category that have been purchased, a slice 302 sized to reflect the number of keywords in that category that are pending, and a slice 303 sized to reflect the number of keywords in that category that have not been purchased. The graphic may be user-specific, and reflect one account owned by the user, a set of accounts owned by the user, or all accounts owned by the user. The graphic may be decorated with additional information pertaining to each slice of the pie or to other features that are relevant to the user. For example, the graphic may identify the expected economic value of each slice (thereby enabling a user to identify the economic value of keywords purchased, not purchased, or pending). The graphic may identify the number of conversions expected for each slice, e.g., the number of clicks expected in each slice, the number of purchases expected for each slice, and so forth. This information may be displayed textually, graphically, or in any other appropriate manner. Any appropriate information that is available to the system may be specified by the user for display and incorporated into the graphic.

Figure 4:
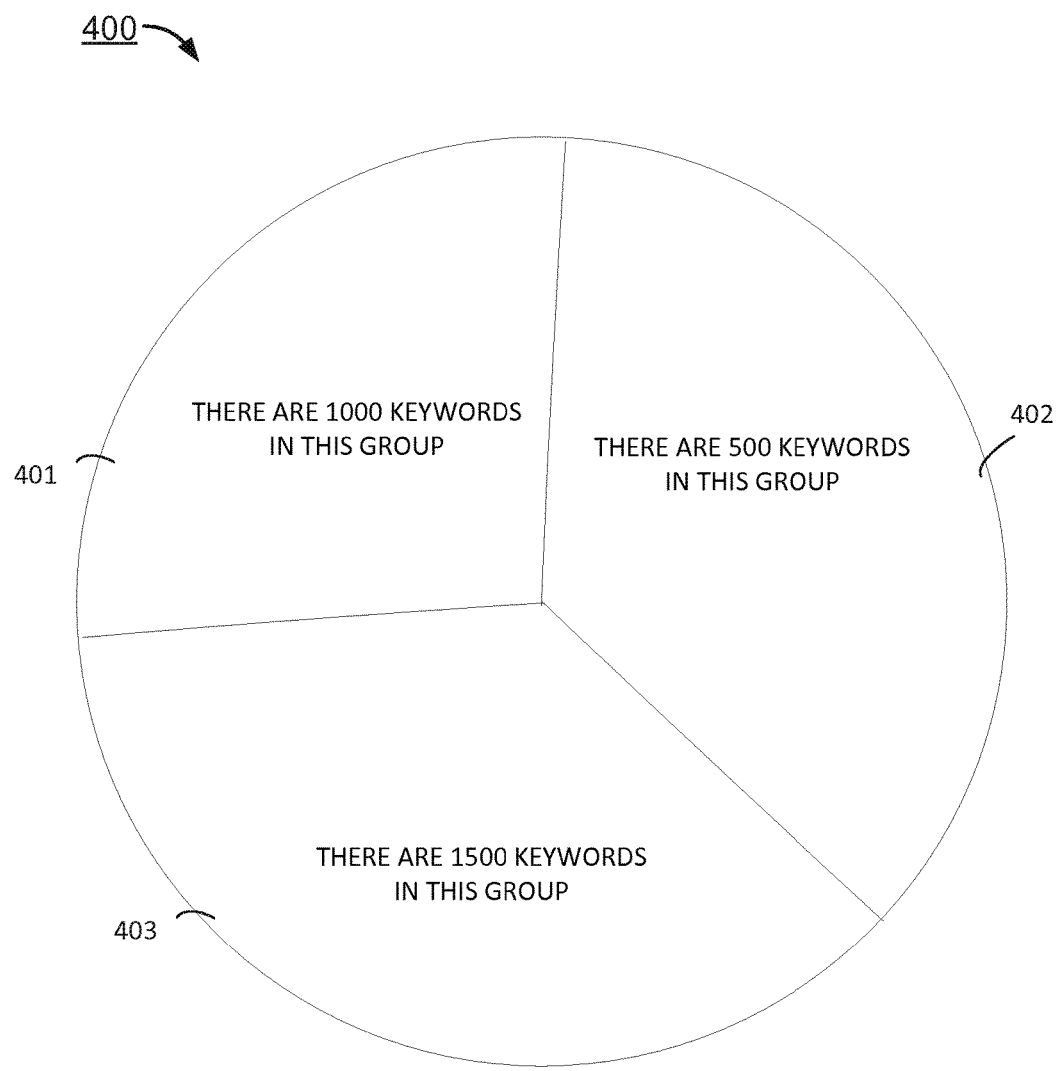

In another example, a user may select to generate a graphic, such as graphic 400 of FIG. 4. In this example, the graphic includes a pie chart having a slice 401 sized to reflect the economic value of keywords in a particular category that have been purchased, a slice 402 sized to reflect the economic value of keywords in that category that are pending, and a slice 403 sized to reflect the economic value of keywords in that category that have not been purchased. As above, the graphic may be user-specific, and reflect one account owned by the user, a set of accounts owned by the user, or all accounts owned by the user. The graphic may be decorated with additional information pertaining to each slice or to other features that are relevant to the user. For example, the graphic may identify the number of keywords in each slice and/or information such as that described above, e.g., the number of conversions expected for each slice, e.g., the number of clicks expected in each slice, the number of purchases expected for each slice, and so forth. This information may be displayed textually, graphically, or in any other appropriate manner.

In some implementations, the graphic may be interactive. For example, in the examples of FIGS. 3 and 4, individual slices of the pie chart may include embedded hyperlinks that are selectable to retrieve a list of keywords in each category or other information pertaining thereto. In this regard, any other appropriate information available to the system may be obtained by selecting an appropriate "active" portion of the graphic. In some implementations, the graphic may be user customized, e.g., through user account settings and with user permission, to enable display and retrieval of any appropriate information about the user, the user's accounts, and so forth, that are available to the content management system.

In some implementations, keywords may be weighted based on a predicted number of impressions resulting from their use. In this example, a graphic may be generated, with parts sized to reflect the predicted number of impressions resulting from use of different keywords (e.g., purchased, pending, etc.).

Figure 5:
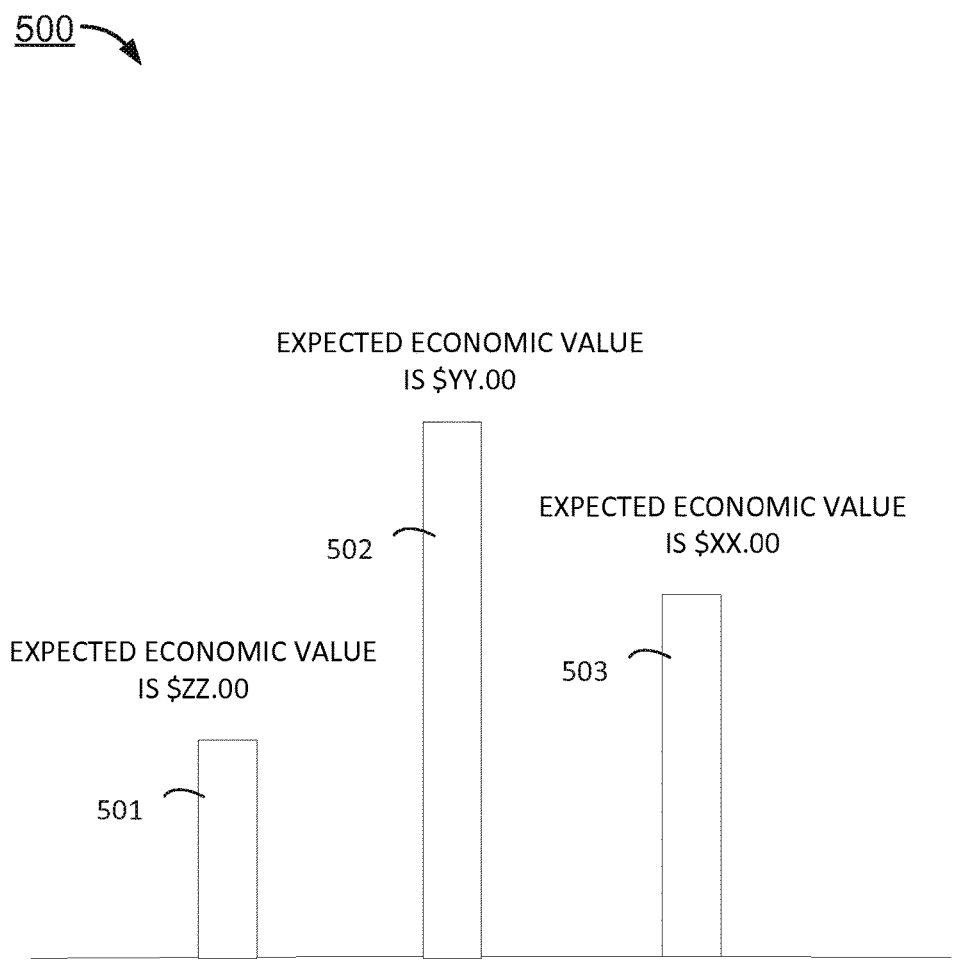

Any appropriate graphic may be generated by process 200 based on the information available to it. In some implementations, the graphic may be a bar chart, such as bar chart 500 shown in FIG. 5, containing bars 501, 502, 503, sized to reflect, respectively, the number of keywords purchased, pending, and new. In some implementations, the graphic may include a combination of a pie chart, a bar chart, and/or any other appropriate graphic elements. For example, the graphic may include a pie chart indicating the percentage of keywords pending, purchased, or neither pending nor purchased. A user may click on one of the pie slices and, in response, the system may generate a bar chart comparing expected economic value for individual or subsets of keywords reflected by the slice of the pie chart that was selected, or for individual keywords reflected by the slice. Examples of other graphic that may be used include Cartesian XY plots, polar coordinate plots, simulated three-dimensional graphs, and so forth. Any appropriate graphic may be generated and displayed.

In some implementations, process 200 may act on keywords in the content management system that are associated with a user's account(s). In some implementations, process 200 may act on keywords that are input by the user, e.g., manually or loaded from one or more documents, accounts, or other appropriate sources. Metadata or other information may be associated with such keywords, which may enable process 200 to classify the keywords and to generate appropriate graphics, either for such keywords alone or in combination with keywords associated with the user in the content management system.

As noted above, the example processes described herein are applicable outside the context of online advertising. In this regard, the example processes are applicable wherever retrieval, organization, and display of information are desired. For example, the example processes may be used in the context of generating and displaying information about online content, such as online video, online images, social network content, electronic commerce, and so forth.

Figure 6:
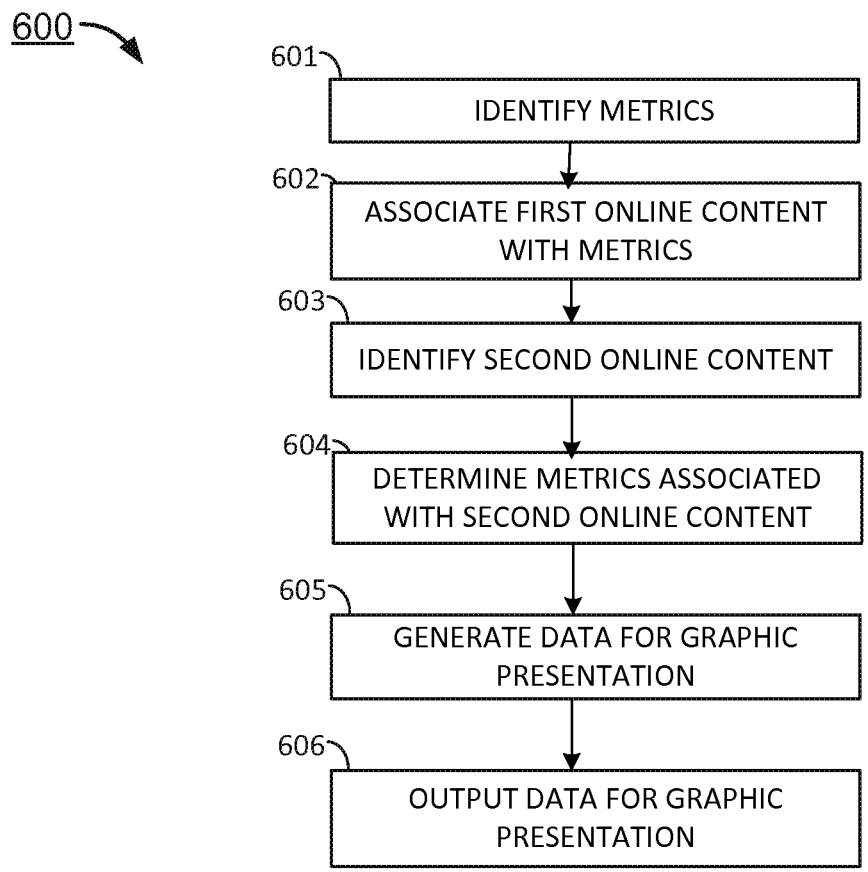
FIG. 6 is flowchart showing another example of a process for providing information about content distribution.

In this regard, example process 600 may be used, e.g., to generate graphic(s) for displaying information relating to views of online content (in this example, video). FIG. 6 is a flowchart showing operations performed by example process 600. In some implementations, process 600 may be performed by a content management system, such as that described herein. In some implementations, process 600 may be triggered in response to a specific user request (e.g., clicking on a link), whereas in other implementations process 600 may be triggered automatically in response to an event, such as selecting a video for viewing. Elements of processes 200 and 600 may be combined, as appropriate.

According to process 600, metrics associated with viewing of online video content ("first online content") are identified (601). For example, the metrics may include, but are not limited to, number of views, number of endorsements (e.g., "likes"), number of subscribers, and so forth. In some implementations, each instance of first online content is associated with a category, which may be used for comparison purposes. For example, the online content may be a video associated with an account owned by a user. In this example, the video may be a comedy, in which case the category is comedies within the user account. Process 600 may be used to display information about the video itself and/or in relation to other videos with respect to the user's account. An example of information that may be displayed is provided below. However, any appropriate type(s) of information may be displayed.

According to process 600, each instance of first online content is associated with (602) data representing one or more of the metrics. In the video example above, data may be associated with the video indicating that the video has had a certain number of views, endorsements, and so forth. This information may be stored in a data object for the video or in any other appropriate manner.

According to process 600, online content ("second online content") is identified (603) that has a relationship to, or commonality with, the first online content. For example, the second online content may be other videos that are comedies and have not been viewed by the user of the online account. Information regarding viewership may be logged upon obtaining appropriate user permission. This information may be searched, along with a database of available online content, to identify comedic videos and those that have not been viewed by the user.

According to process 600, metrics associated with the second online content are determined (604). In this example, the metrics may be the same as those determined above for the first content, although in other examples, some or all of the metrics may be different than those determined for the first content. For example, the metrics may include, but are not limited to, number of views, number of endorsements (e.g., "likes"), number of subscribers, and so forth.

According to process 600, data is generated (605) for use in rendering, on a computing device, a graphic presentation based on based on the first and second online content, metrics associated with the first online content, metrics associated with the second online content, and categories associated with the first and second online content. That data is output (606) to the computing device, which uses the data to render the graphic presentation. The graphic presentation may be rendered, e.g., along with the online content, e.g., along with presentation of a video or on any other appropriate portal. The user may configure how, and when, the graphic presentation is rendered and viewed. For example, the graphic may identify numbers of videos that are similar to the first online content, which the user has not viewed and which have been viewed by others and rated favorably.

As was the case above, the graphic presentation, and attributes thereof, may be configurable by the user. For example, the user may input configuration parameters into the system, e.g., via an account configuration page or through any other appropriate input mechanism. Process 600 (along with process 200) may receive these configuration parameters and generate a user-configured graphic that reflects the information that the user would like displayed. In some implementations, the graphic may be displayed automatically and in some implementations, the user may request display of a graphic (e.g., in response to selection of a hyperlink). How and when the graphic is displayed may also be configured through user input of appropriate configuration parameters.

The processes described herein are not limited to use in the example contexts described above, but rather may be used in any appropriate context to display information about any appropriate subject matter.

Figure 7:
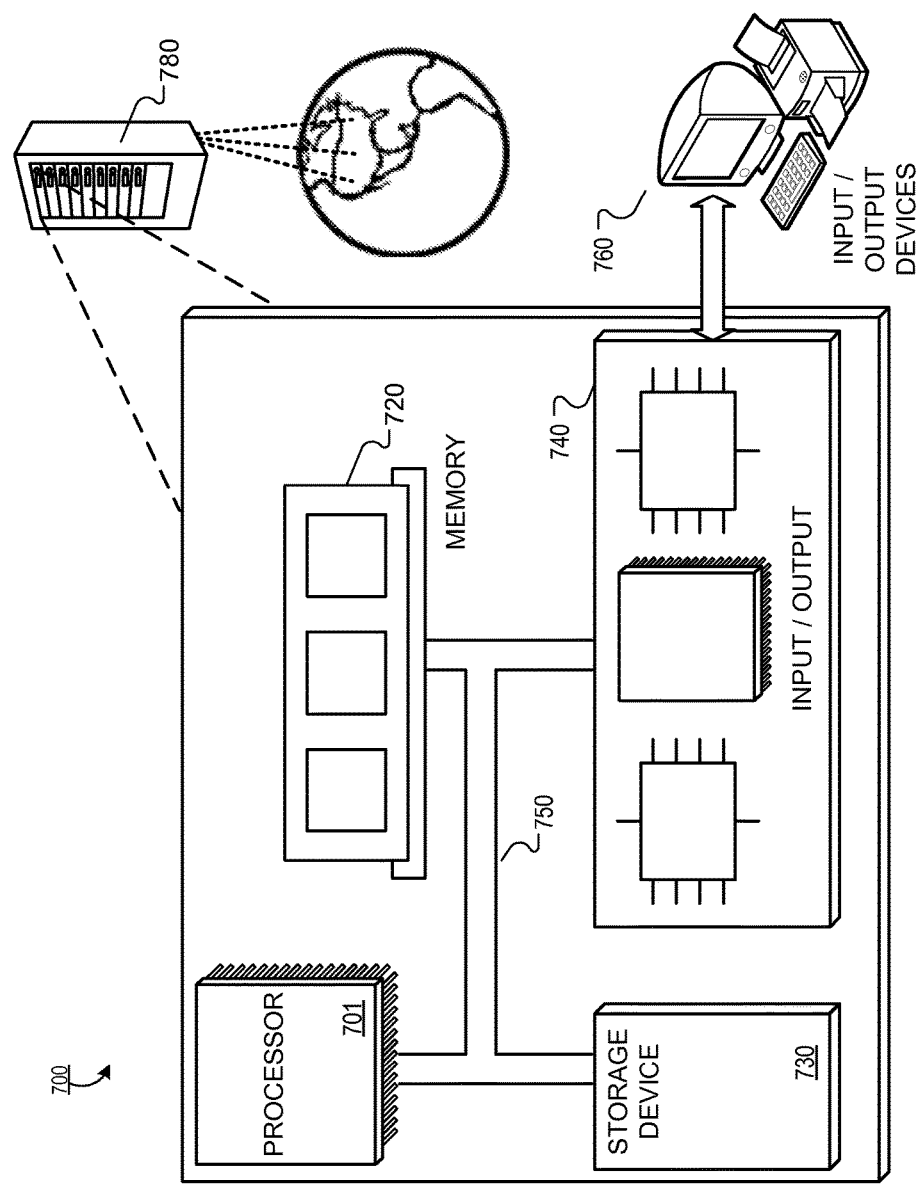
FIG. 7 is a block diagram of a computer system on which the example processes described herein may be performed.

FIG. 7 is block diagram of an example computer system 700 that may be used in performing the processes described herein (e.g., processes 200 and 600). System 700 includes a processor 710, a memory 720, a storage device 730, and an input/output device 740. Each of components 710, 720, 730, and 740 can be interconnected, for example, using a system bus 750. The processor 710 is capable of processing instructions for execution within the system 700. In one implementation, processor 710 is a single-threaded processor. In another implementation, to processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can include, for example, a hard disk device, an optical disk device, or some other large capacity storage device.

The input/output device 740 provides input/output operations for the system 700. In one implementation, the input/output device 740 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 760.

The web server, advertisement server, and impression allocation module can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The web server and advertisement server can be distributively implemented over a network, such as a server farm, or can be implemented in a single computer device.

Example computer system 700 is depicted as a rack in a server 780 in this example. As shown the server may include multiple such racks. Various servers, which may act in concert to perform the processes described herein, may be at different geographic locations, as shown in the figure. The processes described herein may be implemented on such a server or on multiple such servers. As shown, the servers may be provided at a single location or located at various places throughout the globe. The servers may coordinate their operation in order to provide the capabilities to implement the processes.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible program carrier, for example a computer-readable medium, for execution by, or to control the operation of, a processing system. The computer readable medium can be a machine readable storage device, a machine readable storage substrate, a memory device, or a combination of one or more of them.

In this regard, various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Content, such as ads and GUIs, generated according to the processes described herein may be displayed on a computer peripheral (e.g., a monitor) associated with a computer. The display physically transforms the computer peripheral. For example, if the computer peripheral is an LCD display, the orientations of liquid crystals are changed by the application of biasing voltages in a physical transformation that is visually apparent to the user. As another example, if the computer peripheral is a cathode ray tube (CRT), the state of a fluorescent screen is changed by the impact of electrons in a physical transformation that is also visually apparent. Moreover, the display of content on a computer peripheral is tied to a particular machine, namely, the computer peripheral.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Elements of different implementations described herein can be combined to form other implementations not specifically set forth above. Elements can be left out of the processes, computer programs, etc. described herein without adversely affecting their operation. In addition, the logic flows depicted in the figures do not require the particular order shown, or sequential order, to achieve desirable results. Various separate elements can be combined into one or more individual elements to perform the functions described herein.

Other implementations not specifically described herein are also within the scope of the following claims.

What is claimed is:

1. A method comprising:
receiving, by a computer system comprising one or more computers, first data representing first keywords selected by a user for distribution of particular online content of the user and to constitute a first group of keywords, and second data representing second keywords associated by the user with the particular online content and that are (i) distinct from the first keywords, and (ii) selected by the user to constitute a distinct second group of keywords, wherein the first group of keywords and the second group of keywords constitute all keywords received by the computer system from the user and associated by the user with the particular online content provided by the user;
determining, by the computer system, one or more first characteristics of each of the first keywords in the first group and one or more second characteristics of each of the second keywords in the second group;
identifying, by the computer system, a common characteristic, the common characteristic (i) being common to both the one or more first characteristics and the one or more second characteristics, and (ii) includes a category to which each of the first keywords and each of the second keywords belongs, wherein the category reflects a subject matter of keywords or a relationship of keywords to proprietary content;
identifying, by the computer system, third keywords, by searching one or more databases of keywords for other keywords that (i) are identified in the database as having the common characteristic, and (ii) are neither in the first group of keywords selected by the user nor in the second group of keywords selected by the user;
obtaining, by the computer system, one or more metrics calculated based on aggregate interactions of multiple users with online content associated with the first keywords, the second keywords, or the third keywords, wherein the one or more metrics are aggregated based on the keywords associated with the online content and (i) represent a number of views of online content that was provided due to use of any one of the first keywords, the second keywords, or the third keywords, respectively, (ii) are different from the one or more first characteristics, and (iii) are different from the one or more second characteristics; and
outputting, by the computer system, data to enable rendering, on a computing device and to the user, an interactive graphic presentation characterizing the first keywords, the second keywords, and the third keywords, wherein the presentation characterizing the first keywords, the second keywords, and the third keywords is annotated with at least one of the metrics for each of the groups of keywords, wherein the interactive graphic presentation represents values of the one or more metrics for the third keyword group for visual comparison to values of the one or more metrics for the first keyword group and to values of the one or more metrics for the second keyword group.

2. The method of claim 1, wherein the one or more metrics comprise a respective expected economic value associated collectively with the first keywords, collectively with the second keywords, and collectively with the third keywords, the expected economic value being determined based on past economic value resulting from use of the first, second, or third keywords respectively in past distributions of content.

3. The method of claim 1, wherein the one or more metrics comprise a first metric and a second metric, the second metric comprising attributes associated with the first keywords, the second keywords and the third keywords, the attributes being determined based on past use of the first keywords, the second keywords and the third keywords in past distributions of content;
wherein the interactions are click-throughs of a particular keyword in the first group or of a particular keyword in the second group, wherein a click-through is at least one of a mouse click, a touch, or a programmatic selection; and
wherein the interactive graphic presentation comprises a graphic that is shaped by the first metric and that incorporates information about the second metric, or the interactive graphic presentation comprises a graphic that is shaped by the second metric and incorporates information about the first metric.

4. One or more non-transitory machine-readable storage devices storing instructions that are executable by one or more processing devices to perform operations comprising:
receiving, by a computer system comprising one or more computers, first data representing first keywords selected by a user for distribution of particular online content of the user and to constitute a first group of keywords, and second data representing second keywords associated by the user with the particular online content and that are (i) distinct from the first keywords, and (ii) selected by the user to constitute a distinct second group of keywords, wherein the first group of keywords and the second group of keywords constitute all keywords received by the computer system from the user and associated by the user with the particular online content provided by the user;
determining, by the computer system, one or more first characteristics of each of the first keywords in the first group and one or more second characteristics of each of the second keywords in the second group;
identifying, by the computer system, a common characteristic, the common characteristic (i) being common to both the one or more first characteristics and the one or more second characteristics, and (ii) includes a category to which each of the first keywords and each of the second keywords belongs, wherein the category reflects a subject matter of keywords or a relationship of keywords to proprietary content;
identifying, by the computer system, third keywords, by searching one or more databases of keywords for other keywords that (i) are identified in the database as having the common characteristic, and (ii) are neither in the first group of keywords selected by the user nor in the second group of keywords selected by the user;
obtaining, by the computer system, one or more metrics calculated based on aggregate interactions of multiple users with online content associated with the first keywords, the second keywords, or the third keywords, wherein the one or more metrics are aggregated based on the keywords associated with the online content and (i) represent a number of views of online content that was provided due to use of any one of the first keywords, the second keywords, or the third keywords, respectively, (ii) are different from the one or more first characteristics, and (iii) are different from the one or more second characteristics; and outputting, by the computer system, data to enable rendering, on a computing device and to the user, an interactive graphic presentation characterizing the first keywords, the second keywords, and the third keywords, wherein the presentation characterizing the first keywords, the second keywords, and the third keywords is annotated with at least one of the metrics for each of the groups of keywords, wherein the interactive graphic presentation represents values of the one or more metrics for the third keyword group for visual comparison to values of the one or more metrics for the first keyword group and to values of the one or more metrics for the second keyword group.

5. The one or more non-transitory machine-readable storage devices of claim 4, wherein the one or more metrics comprise one of (i) a respective expected economic value associated collectively with the first keywords, collectively with the second keywords, and collectively with the third keywords, (ii) a respective number of impressions associated collectively with the first keywords, collectively with the second keywords, and collectively with the third keywords, (iii) a respective number of clicks associated collectively with the first keywords, collectively with the second keywords, and collectively with the third keywords, or (iv) a respective number of conversions associated collectively with the first keywords, collectively with the second keywords, and collectively with the third keywords, wherein the expected economic value is determined based on past economic value resulting from use of the first, second, or third keywords respectively in past distribution of content.

6. The one or more non-transitory machine-readable storage devices of claim 4, wherein the one or more metrics comprise a first metric and a second metric, the second metric comprising attributes associated with the first keywords, the second keywords and the third keywords, the attributes being determined based on past use of the first keywords, the second keywords and the third keywords in past distributions of content; and wherein the interactive graphic presentation comprises a graphic that is shaped by the first metric and that incorporates information about the second metric, or the interactive graphic presentation comprises a graphic that is shaped by the second metric and incorporates information about the first metric.

7. The method of claim 1, further comprising:

generating, by the computer system, one or more data objects that include data representing the one or more metrics based on the first keywords, the second keywords, and the third keywords; and using, by the computer system, the one or more data objects to render the interactive graphic presentation.

8. The method of claim 7, wherein:

each of the one or more data objects is associated with a single one of (i) the first keywords (ii) the second keywords, or (iii) the third keywords.

9. The method of claim 7, wherein:

the one or more data objects include a first data object that is associated with the first keywords and that includes the first keywords, a second data object that is associated with the second keywords and that includes the second keywords, and a third data object that is associated with the third keywords and that includes the third keywords.

10. A system comprising:

one or more computers and one or more storage devices on which are stored instructions that are operable, when executed by the one or more computers, to cause the one or more computers to perform operations comprising:

receiving, by a computer system comprising one or more computers, first data representing first keywords selected by a user for distribution of particular online content of the user and to constitute a first group of keywords, and second data representing second keywords associated by the user with the particular online content and that are (i) distinct from the first keywords, and (ii) selected by the user to constitute a distinct second group of keywords, wherein the first group of keywords and the second group of keywords constitute all keywords received by the computer system from the user and associated by the user with the particular online content provided by the user;

determining, by the computer system, one or more first characteristics of each of the first keywords in the first group and one or more second characteristics of each of the second keywords in the second group;

identifying, by the computer system, a common characteristic, the common characteristic (i) being common to both the one or more first characteristics and the one or more second characteristics, and (ii) includes a category to which each of the first keywords and each of the second keywords belongs, wherein the category reflects a subject matter of keywords or a relationship of keywords to proprietary content;

identifying, by the computer system, third keywords, by searching one or more databases of keywords for other keywords that (i) are identified in the database as having the common characteristic, and (ii) are neither in the first group of keywords selected by the user nor in the second group of keywords selected by the user;

obtaining, by the computer system, one or more metrics calculated based on aggregate interactions of multiple users with online content associated with the first keywords, the second keywords, or the third keywords, wherein the one or more metrics are aggregated based on the keywords associated with the online content and (i) represent a number of views of online content that was provided due to use of any one of the first keywords, the second keywords, or the third keywords, respectively, (ii) are different from the one or more first characteristics, and (iii) are different from the one or more second characteristics; and outputting, by the computer system, data to enable rendering, on a computing device and to the user, an interactive graphic presentation characterizing the first keywords, the second keywords, and the third keywords, wherein the presentation characterizing the first keywords, the second keywords, and the third keywords is annotated with at least one of the metrics for each of the groups of keywords, wherein the interactive graphic presentation represents values of the one or more metrics for the third keyword group for visual comparison to values of the one or more metrics for the first keyword group and to values of the one or more metrics for the second keyword group.

11. The system of claim 10, wherein the one or more metrics comprise a respective expected economic value associated collectively with the first keywords, collectively with the second keywords, and collectively with the third keywords, the expected economic value being determined based on past economic value resulting from use of the first, second, or third keywords respectively in past distributions of content.

12. The system of claim 10, wherein the one or more metrics comprise a first metric and a second metric, the second metric comprising attributes associated with the first keywords, the second keywords and the third keywords, the attributes being determined based on past use of the first keywords, the second keywords and the third keywords in past distributions of content; and
   wherein the interactive graphic presentation comprises a graphic that is shaped by the first metric and that incorporates information about the second metric, or the interactive graphic presentation comprises a graphic that is shaped by the second metric and incorporates information about the first metric.

13. The system of claim 10, wherein the operations further comprise:
   generating, by the computer system, one or more data objects that include data representing the one or more metrics based on the first keywords, the second keywords, and the third keywords; and
   using, by the computer system, the one or more data objects to render the interactive graphic presentation.

14. The system of claim 13, wherein the operations further comprise:
   outputting, to the computing device, data representing a list of the data objects, the list including indicia identifying the data objects; and
   receiving, from the computing device, data representing a selection corresponding to one of the data objects from the list;
   wherein the data to enable the rendering is output in response to receipt of the data representing the selection.

15. The system of claim 13, wherein:
   each of the one or more data objects is associated with a single one of (i) the first keywords, (ii) the second keywords, or (iii) the third keywords.

16. The system of claim 13, wherein:
   the one or more data objects include a first data object that is associated with the first keywords and that includes the first keywords, a second data object that is associated with the second keywords and that includes the second keywords, and a third data object that is associated with the third keywords and that includes the third keywords.

17. The one or more non-transitory machine-readable storage devices of claim 4, wherein the operations further comprise:
   generating, by the computer system, one or more data objects based on the first keywords, the second keywords, and the third keywords; and
   outputting, by the computer system, the one or more data objects to enable the rendering of the interactive graphic presentation.

18. The method of claim 7, further comprising:
   outputting, to the computing device, data representing a list of the data objects, the list including indicia identifying the data objects; and
   receiving, from the computing device, data representing a selection corresponding to one of the data objects from the list;
   wherein the data to enable the rendering is output in response to receipt of the data representing the selection.

19. The one or more non-transitory machine-readable storage devices of claim 17, wherein the operations further comprise:
   outputting, to the computing device, data representing a list of the data objects, the list including indicia identifying the data objects; and
   receiving, from the computing device, data representing a selection corresponding to one of the data objects from the list;
   wherein the data to enable the rendering is output in response to receipt of the data representing the selection.

* * * * *

UNITED STATES PATENT AND TRADEMARK OFFICE
CERTIFICATE OF CORRECTION

PATENT NO. : 9,984,159 B1  
APPLICATION NO. : 14/457779  
DATED : May 29, 2018  
INVENTOR(S) : Lewis et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 650 days.

Signed and Sealed this  
Eighteenth Day of December, 2018

Andrei Iancu  
*Director of the United States Patent and Trademark Office*